United States Patent
Morino Baquetto et al.

(10) Patent No.: US 12,463,977 B2
(45) Date of Patent: Nov. 4, 2025

(54) ACCESS CONTROL MANAGEMENT

(71) Applicant: AMADEUS S.A.S., Biot (FR)

(72) Inventors: Mathieu Morino Baquetto, Nice (FR); Julien Romuald René Bruguier, Antibes (FR); Alessandro De Troia, Lucera (IT); Jeremie Barlet, Nice (FR)

(73) Assignee: AMADEUS S.A.S., Biot (FR)

( * ) Notice: Subject to any disclaimer, the term of this patent is extended or adjusted under 35 U.S.C. 154(b) by 203 days.

(21) Appl. No.: 18/319,812

(22) Filed: May 18, 2023

(65) Prior Publication Data
US 2023/0388315 A1    Nov. 30, 2023

(30) Foreign Application Priority Data
May 25, 2022   (EP) .................................. 22305775

(51) Int. Cl.
*H04L 9/40*       (2022.01)
*G06F 9/48*       (2006.01)

(52) U.S. Cl.
CPC .......... *H04L 63/105* (2013.01); *G06F 9/4881* (2013.01); *H04L 63/102* (2013.01)

(58) Field of Classification Search
CPC .... H04L 63/105; H04L 63/102; G06F 9/4881
See application file for complete search history.

(56) References Cited

U.S. PATENT DOCUMENTS

| | | | | |
|---|---|---|---|---|
| 6,421,683 | B1 * | 7/2002 | Lamburt | G06F 16/25 |
| | | | | 710/33 |
| 6,668,253 | B1 * | 12/2003 | Thompson | G06Q 10/06 |
| 6,772,350 | B1 | 8/2004 | Belani et al. | |
| 12,153,560 | B1 * | 11/2024 | Talbot | G06F 16/211 |
| 2006/0059211 | A1 | 3/2006 | Futatsugi | |
| 2009/0319594 | A1 * | 12/2009 | Schneider | G06F 9/541 |
| | | | | 709/201 |
| 2013/0198868 | A1 | 8/2013 | Georgiev | |
| 2015/0006507 | A1 * | 1/2015 | Piecko | G06F 16/26 |
| | | | | 707/714 |
| 2020/0311065 | A1 * | 10/2020 | Martin | G06F 16/2453 |

OTHER PUBLICATIONS

Vaidya et al., "The Role Mining Problem", ACM Transactions on Information and System Security, ACM, New York, NY, US, vol. 13, No. 3, Jul. 30, 2010.

* cited by examiner

*Primary Examiner* — Kristie D Shingles
(74) *Attorney, Agent, or Firm* — Perry + Currier Inc.

(57) ABSTRACT

Access control is performed in an information technology system comprising a normalized access control database and a denormalized access control database. In response to an update request from a client to change the access rights of a higher hierarchy level entity, the access rights of the higher hierarchy level entity are updated in the normalized database. Furthermore, updated access control rights for one or more corresponding lower hierarchy level entities related to the higher hierarchy level entity are computed and stored in a denormalized database. An access request from one of the one or more lower hierarchy level entities is served on the basis of the updated access rights at the lower hierarchy level stored in the denormalized database.

19 Claims, 9 Drawing Sheets

| Normalized Database | | | | |
|---|---|---|---|---|
| Hierarchy Level | Entity ID | Higher Member | Lower Member | Access Rights |
| Highest | X | - | U | A, B |
| Highest | Y | - | V, W | C |
| High | U | X | M, N | D, E |
| High | V | Y | O | F |
| High | W | Y | P | F |
| Low | M | U | - | G, H |
| Low | N | U | - | G, H |
| Low | O | V | - | I, J, K |
| Low | P | W | - | I, J |

FIG. 2A

| Denormalized Database | | | |
|---|---|---|---|
| Hierarchy Level | Entity ID | Membership | Access Rights |
| Flat | X | - | A, B |
| Flat | Y | - | C |
| Flat | U | X | A, B, D, E |
| Flat | V | Y | C, F |
| Flat | W | Y | C, F |
| Flat | M | X, U | A, B, D, E, G, H |
| Flat | N | X, U | A, B, D, E, G, H |
| Flat | O | Y, V | C, F, I, J, K |
| Flat | P | Y, W | C, F, I, J |

FIG. 2B

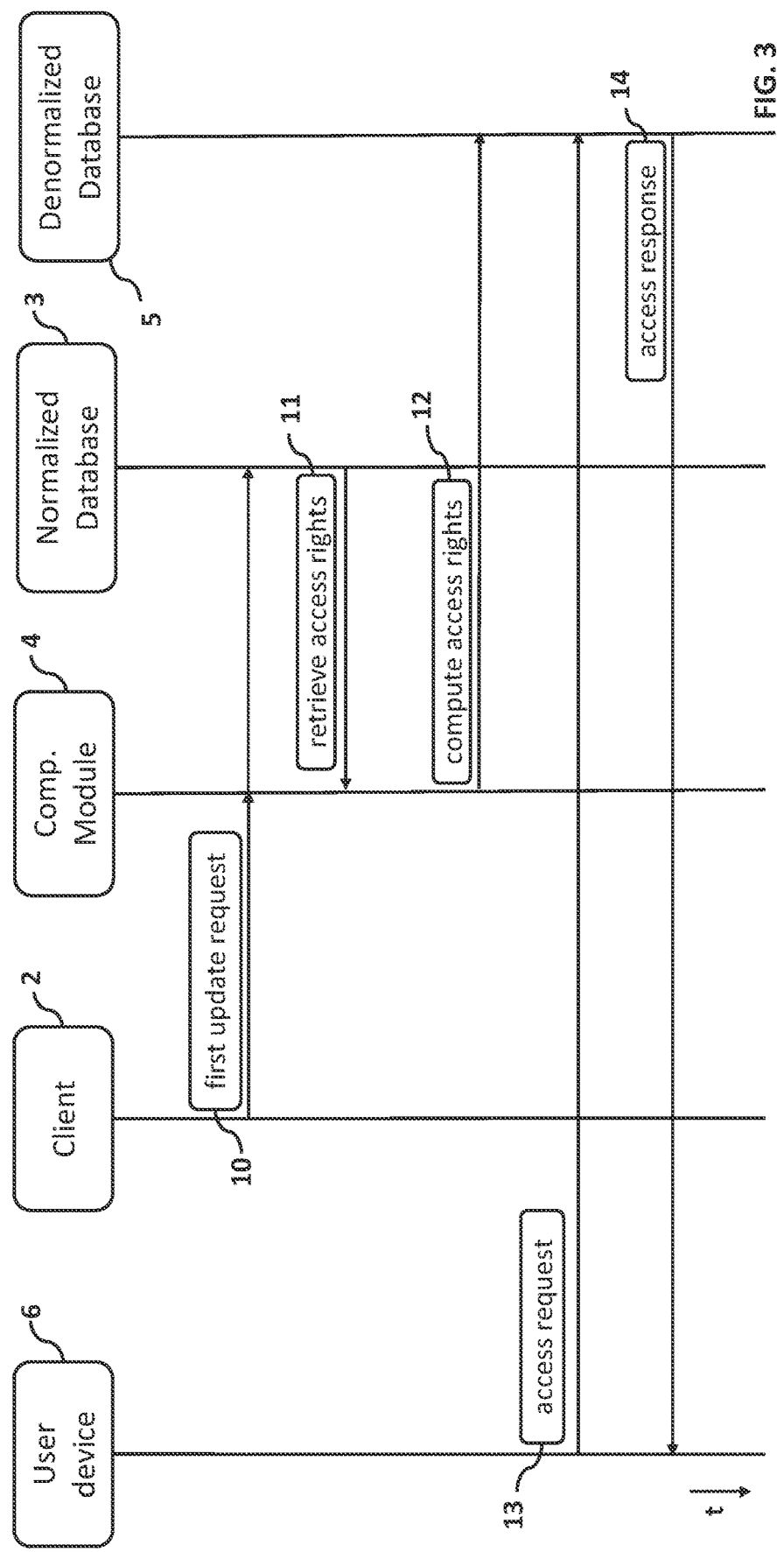

ACCESS CONTROL MANAGEMENT

CROSS-REFERENCE TO RELATED APPLICATION

This application claims priority to European patent application no. 22305775.3, filed May 25, 2022, the content of which is incorporated herein by reference.

FIELD

The present disclosure generally relates to access control in an information technology system. More specifically, it relates to a mechanism to efficiently access control management and check of access requests by users with access rights stemming from a hierarchical access right framework.

BACKGROUND

Access control with access rights defining access permissions to resources in a digital work environment is an important aspect of data security, data protection and information technology (IT) security. Due to increasing volumes of local and remote accesses to communication networks via local area networks (LAN) and/or wide area networks (WAN) including the Internet to resources of an IT system, access rights control is usually employed to share resources between a multitude of users or user groups.

Entities such as companies or universities traditionally define user access rights based on a user's position or role in the entity. Units or divisions such as a production unit, a development group, an accounting division, etc. are usually equipped with different access rights due to their different roles and privileges. In addition, access rights may also vary across individual people, e.g. a chief technical officer may need to access other IT resources than a chief financial officer. Hence, the access rights may be defined at various levels of an organisation, e.g. at a unit or division level, and a personal level, thus forming a hierarchy of access rights.

An example of such a user hierarchy access system is U.S. Pat. No. 6,772,350 B1. An access controller receives a request from a user requesting performance of operations on a particular resource in the system. The requested operations are attempted to be resolved by the access controller by way of user hierarchy information and access list information for the particular resource. If the attempt to resolve the operations is not entirely successful, the access controller additionally uses resource hierarchy information and access list information for the resources in the resource hierarchy information.

SUMMARY

At access time, the specific access rights of the access requesting entity are to be determined. In a hierarchical framework of access right, the access requesting entity may have native access rights personally defined for the entity, as well as access rights (or restrictions) that the entity may inherit from higher hierarchy levels, e.g. entity groups the entity is a member of, and further entity groups of which the aforementioned entity groups are members on their own, all of the entity groups being equipped with additional access rights and/or restrictions. Hence, at access time, these access rights defined at higher levels of the access rights hierarchy are to be resolved.

Such propagation of access rights includes a time- and resource-consuming computation which is more time- and resource-demanding the more complex the access rights hierarchy is. For example, access rights propagation over three levels of access rights requires more time and computing resources than access rights propagation over two levels, and determining the access rights inherited from three entity groups require more time and computation resources than determining the access rights inherited from two entity groups.

Moreover, determining the access rights of an entity by propagating access rights from higher level of the access rights hierarchy such as entity groups occur each time an IT resource is accessed. Hence, even small gains in efficient access rights determination can have a significant impact as these gains quickly cumulate over time.

Thus, access control mechanisms are desirable which render the determination of access rights at access time more efficient in terms of computation time and resources.

According to a first aspect, an access control method performed in an information technology system is presented. The system includes a normalized access control database and a denormalized access control database. The normalized access control database stores access rights of a plurality of entities in an entity hierarchy with at least two hierarchy levels, a higher hierarchy level and a lower hierarchy level. The plurality of entities comprise higher hierarchy level entities of the higher hierarchy level and lower hierarchy level entities at the lower hierarchy level, and the denormalized access control database stores the access rights of at least the lower hierarchy level entities. A first update request is received from a client to change the access rights of at least one higher hierarchy level entity. The access rights of the at least one higher hierarchy level entity is updated in the normalized database. Updated access rights are computed for one or more corresponding lower hierarchy level entities which are related to the at least one higher hierarchy level entity corresponding to the updated access rights and the updated access control rights of the one or more lower hierarchy level entities are stored in the denormalized database. An access request from one of the one or more lower hierarchy level entities is served on the basis of the updated access rights at the lower hierarchy level stored in the denormalized database.

In embodiments, the denormalized access control database stores access rights of the lower hierarchy level entities. In some embodiments, however, the denormalized access control database additionally stores the access rights of higher hierarchy level entities. The method then further comprises storing the updated access rights of the one or more corresponding higher hierarchy level entities and the corresponding lower hierarchy level entities in the denormalized database.

In embodiments, the information technology system comprises a scheduler and at least one processing queues. In some embodiments, the information technology comprises at least two processing queues, a first processing queue and a second processing queue, and computing the updated access rights comprises: storing, in response to updating the access right in the normalized database, a first update event record indicating the higher hierarchy level entity in the first processing queue; retrieving, by the scheduler, the first update event record from the first processing queue and identifying, based on the indication in the first update event record, the one or more corresponding lower hierarchy level entities which are related to the at least one higher hierarchy level entity; retrieving, by the scheduler, the updated access rights of the higher hierarchy level entity and the access rights of the one or more corresponding lower hierarchy level entities from the normalized database; storing a first entity event record per corresponding lower hierarchy level entity including the retrieved updated access rights of the higher hierarchy level entity and the retrieved access rights of the one or more lower hierarchy level entities in the second processing queue; and retrieving, by the scheduler, the first entity event records from the second processing queue and mapping the updated access rights of the higher hierarchy level entity and the access rights of the one or more lower hierarchy level entities to obtain updated access rights of the one of more corresponding lower hierarchy level entities.

In embodiments, the first update event record and any further update event records comprise a priority, wherein the scheduler prioritizes the retrieval of the first update event record and the further update event records from the first processing queue based on the priority.

In embodiments, the first update event record and the further update event records comprise a time stamp indicating a point of time of the storage in the first processing queue.

In embodiments, method further comprises: receiving a second update request from the client to change the access rights of the lower hierarchy level entity, wherein the first update request is received at a first point of time and the second update request is received at a second point of time which is later than the first point of time; updating the access rights of the higher hierarchy level entity in the normalized database; storing a second update event record for the lower hierarchy level entity in the first processing queue, the second update event record indicating the lower hierarchy level entity and having set the priority higher than the priority of the first update event record such that both, the first update event record and the second update event record are stored in the first processing queue with the time stamp of the first update event record indicating an earlier point of time than the time stamp of the second update event record; retrieving, by the scheduler, based on the priority of the first update event record and the priority of the second update event record, the second update event record from the first processing queue; identifying, based on the indication in the first update event record, the corresponding higher hierarchy level entity which is related to the lower hierarchy level entity; retrieving, from the normalized database, the access rights of the identified higher hierarchy level entity; mapping the retrieved access rights of the higher hierarchy entity to the updated access control rights of the lower hierarchy entity; storing the updated access rights of the one or more lower hierarchy level entities in the denormalized database; in response to retrieving, by the scheduler, the first entity event records from the second processing queue, discarding, based on the time stamp of the first entity event records inherited from the first update event record, the first entity event record indicating the lower hierarchy level entity from the second processing queue.

In embodiments, wherein the entity hierarchy comprises further hierarchy levels in addition to the higher and the lower hierarchy level. For example, in some embodiments, the entity hierarchy comprises a highest hierarchy level above the higher hierarchy level and the plurality of entities comprise a highest hierarchy level entity, and wherein the higher hierarchy level entity is a member of the highest hierarchy level entity inheriting access rights of the highest hierarchy level entity and the one or more lower hierarchy level entities are members of the higher hierarchy level entity inheriting the access rights of the higher hierarchy level entity. In such embodiments, computing the updated access rights further comprises: identifying, based on the indication in the first update event record, the highest hierarchy level entity; retrieving, from the normalized database, the access rights of the highest hierarchy level entity; and mapping the retrieved access rights of the highest hierarchy level entity to the updated access control rights of the higher hierarchy level entity.

In embodiments, the method further comprises: receiving a second update request from the client to change the access rights of the highest hierarchy level entity; updating the access rights of the highest hierarchy level entity in the normalized database; wherein computing updated access rights for the one or more lower hierarchy level entities comprises computing updated access rights for the one or more corresponding higher hierarchy level entities which are related to the highest hierarchy level entity corresponding to the updated access rights of the highest hierarchy level entity.

In embodiments, computing updated access rights for the higher hierarchy level entities comprises: storing a second update event record for the highest hierarchy level entity in the first processing queue, the second update event record indicating the highest hierarchy level entity; retrieving, by the scheduler, the second update event record from the first processing queue and identifying, based on the indication in the second update event record, the one or more corresponding higher hierarchy level entities which are related to the at least one highest hierarchy level entity; storing a second entity event record per corresponding higher hierarchy level entity including the updated access rights of the highest hierarchy level entity and the access rights of the one or more higher hierarchy level entities in the second processing queue; retrieving, by the scheduler, the second entity event record from the second processing queue and identifying the one or more corresponding lower hierarchy level entities which are related to the one or more higher hierarchy level entities; storing a third entity event record per corresponding lower hierarchy level entity including the updated access rights of the highest hierarchy level entity, the updated access rights of the higher hierarchy level entity and the retrieved access rights of the one or more lower hierarchy level entities in the second processing queue; and retrieving, by the scheduler, the third entity event records from the second processing queue and mapping the updated access rights of the highest hierarchy level entity, the updated access rights of the higher hierarchy level entity and the access rights of the one or more lower hierarchy level entities to obtain updated access rights of the one or more corresponding lower hierarchy level entities.

In embodiments, the priority of the first update event record is set higher than the priority of the second update event record.

In embodiments, the first entity event records stored in the second processing queue inherit the priority and the time stamp of the first update event record and the second entity event records and the third entity event records inherit the priority and the time stamp of the second update event record.

In embodiments, the first update request is received at a first point of time and the second update request is received at a second point of time which is before the first point of time, such that both, the first update event record and the second update event record are stored in the first processing queue and the time stamp of the first update event record indicates a later point of time than the time stamp of the second update event record, and the method further comprises: retrieving, by the scheduler, based on the priority of the first entity event records inherited from the first update event record and the priority of the third entity event records inherited from the second update event record, the first entity event records from the second processing queue; discarding, based on the time stamp of the first entity event records inherited from the first update event record and the time stamp of the third entity event records inherited from the second update event record, the third entity event record from the second processing queue.

In accordance with a second aspect, the information technology system is arranged to perform the aforementioned functionality.

In accordance with a third aspect, a computer program is presented in which the execution of such program causes a computer to perform the aforementioned functionality.

Further aspects are apparent from the subsequent description.

BRIEF DESCRIPTION OF THE FIGURES

Aspects and examples of the present disclosure are described with reference to the following figures, in which:

FIGS. 2A and 2B show exemplary data structures in the access rights databases.

FIG. 3 depicts the present methodologies at a general level by way of a message sequence chart.

DETAILED DESCRIPTION

Figure 1:
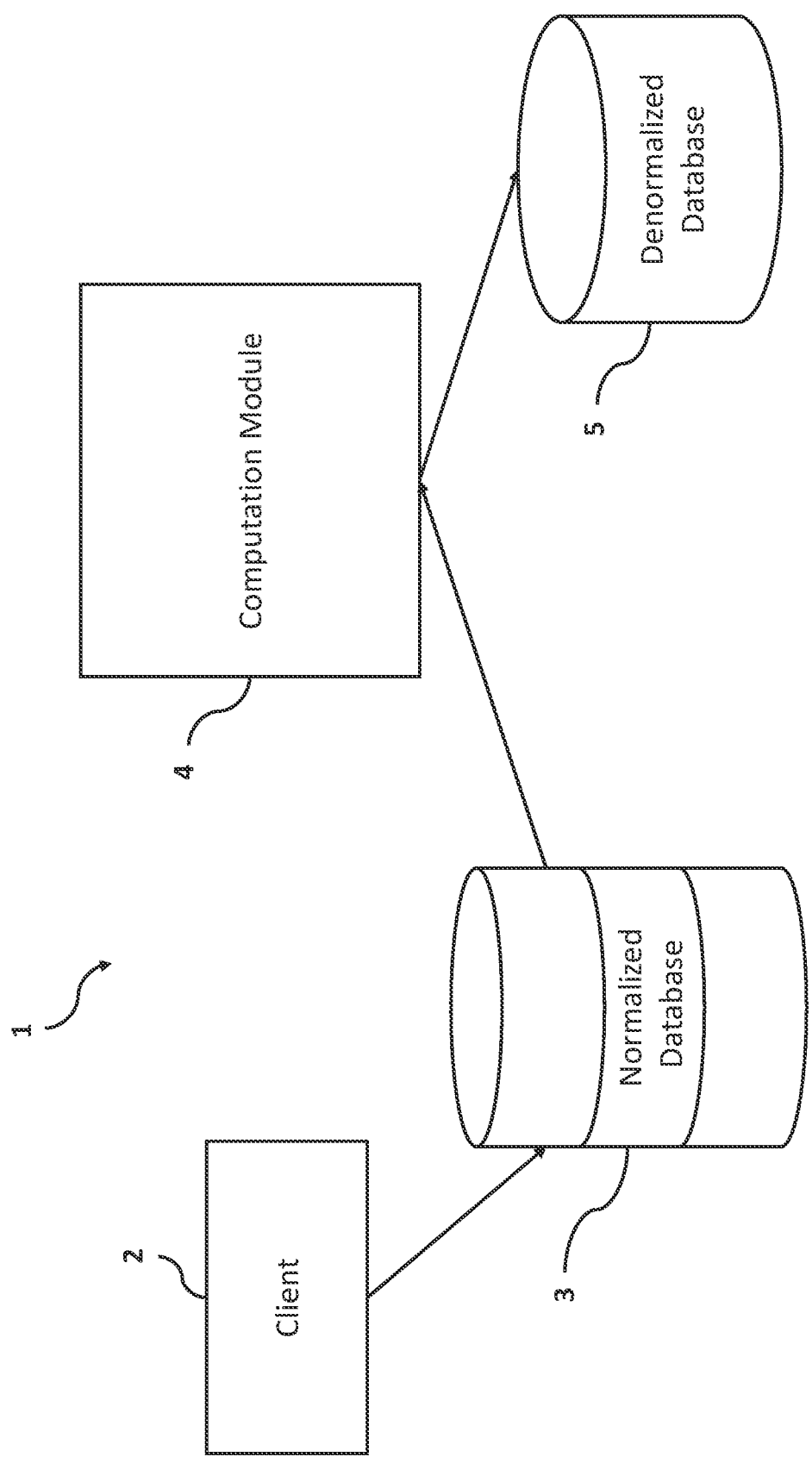
FIG. 1 depicts the general structure of the information technology system.

User hierarchies in information technology systems and other computer-based fields are traditionally utilized to organize the structures of companies (or other entities such as universities or public administration services) and to assign tasks and access rights among the users in order to structure and control access to data, applications, network nodes or any sorts of resources in a company's information technology system. Such hierarchy often reflects organizational structures of the company. Thus, access rights are usually defined and assigned according to the positions of employees and people in the organizational structure of the company. This leads to a hierarchical access rights structure and provides a defined access rights framework for users, to ensure data security, data protection and information technology security.

Updates of access rights are usually managed by a system administrator. For example, a new employee in the company is given a newly created user account with access rights corresponding to the position of the employee. Changes in the organizational structure of the company such as establishing a new division or new site may cause a corresponding adaption of the access rights.

The access to a resource in an information technology system (e.g. an application, a service, a database, a file, a printer, a server, a station, a subnetwork, etc.) is usually requested by entities at a lowest access rights hierarchy level, i.e. by users which often represent the access-requesting person itself. To examine and verify whether or not the requesting user or entity has sufficient permissions to access the requested resource, the relevant access rights of the entity are to be determined and checked against the requested resource. To this end, the entity's native access rights at the lowest (personal) access rights hierarchy level are checked, as well as any access rights derived from upper levels of the hierarchical structure. Breaking down access rights from higher access rights level to the lowest level for this purpose is referred to as propagation or inheritance of access rights from higher access rights levels to the lowest access rights level.

To render access right verification more efficient at access request time, a denormalized access control database (briefly: denormalized database) is provided herein which maintains consolidated access rights of entities at the at least lowest hierarchy level in the access rights hierarchy, i.e. access rights of entities inherited from higher access rights hierarchy levels are pre-computed and stored in the denormalized database. Hence, at access request time, the denormalized database is queried and propagation of access rights from higher access rights hierarchy levels can be avoided. Moreover, the present disclosure is concerned with mechanisms to transform access rights definitions stored in a normalized access control database (briefly: normalized database) over multiple access rights hierarchy levels into the flat access rights definitions with factorized access rights derived from higher hierarchy levels.

To this end, as mentioned before, the present information technology system comprises the normalized access control database and the denormalized access control database. The normalized access control database stores access rights of a plurality of entities in an entity hierarchy with at least two hierarchy levels, a higher hierarchy level and a lower hierarchy level, wherein the plurality of users comprise higher hierarchy level users of the higher hierarchy level and lower hierarchy level users at the lower hierarchy level, and the denormalized access control database stores the access rights of the at least lower hierarchy level entities. The term entity as used herein refers to any entity potentially accessing IT resources such as an individual person, a user account, a device, an application, a server system, an administrator, an organizational group, and the like.

A simplified architecture of such information technology system is shown by FIG. 1. Accordingly, the information technology system 1 includes a client 2, a normalized database 3, a computation module 4 and a denormalized database 5. In practice, additional clients, databases and/or computation modules as well as other nodes (e.g. servers, routers, switches, etc.) may be present. The elements of the system 1 are communicatively coupled by way of communications interfaces. The communication interfaces may be a wired and/or wireless as well as a local or remote networked connection such as a connection via the Internet. A part of the communication interface may be implemented by way of a mobile communication network such as a 3G/4G/5G network according to ETSI/3GPP specifications and/or a WiFi/WLAN network according to IEEE specifications.

The client 2 is a user device, for example an IT device of a system administrator, a supervisor or any other entity managing and configuring the information technology system 1. Non-limiting examples of the client 2 are a personal computer, a laptop, a mobile station, a server, or the like. The client 2 is utilized to perform the system administration and configuration tasks including adding, deleting and/or updating access rights of users or user accounts which exist in the IT system 1. To this end, the client 2 sends update requests in order to change the access rights of one or more entities at any one of the access rights hierarchy levels, e.g. the higher hierarchy level, the highest hierarchy level and/or the lower hierarchy level. These update requests are received by any request processing entity of the IT system 1 and processing result of the update requests i.e., the updated access rights, are stored in the normalized database 3.

The normalized database 3 stores the access rights of entities of the IT system 1 in an access control hierarchy with multiple hierarchy levels. Hence, the access control hierarchy includes at least two hierarchy levels, hereinafter referred to as higher hierarchy level and lower hierarchy level. The lower hierarchy level e.g. specifies the access rights defined at the personal level of the individual entity which include users, while the higher hierarchy level includes access rights defined at entity group level, e.g. per company division, project group or the like. For example, at the higher hierarchy level, general rights are defined that apply to any entity, group or user that is subordinate in the hierarchy, wherein at the lower hierarchy levels, specific access rights are assigned to users. In practice, more than two access control hierarchy levels may be present, such as three, four, five or more levels. In non-limiting embodiments described herein, three hierarchy levels are defined, wherein the upper hierarchy level is denoted hereinafter as the highest hierarchy level. The term "normalized" is utilized herein to express that the access rights are stored in the normalized database 3 in accordance with the individual access rights hierarchy levels.

The access rights of the IT system 1 may be defined by way of group membership of entities or access control lists for system resources. Access rights may include positive access rights, e.g. an entry in the normalized database 3 positively allows access to a particular resource, and/or negative access rights, e.g. an entry in the normalized database 3 denies access to a particular resource. Moreover, access rights may be specified for different access types, such as read, write, delete, copy, print, forward, etc.

To further illustrate the operation of the normalized database 3, a simplified example is given in FIG. 2A. Two entities at the highest hierarchy level with general rights are defined, entity X symbolizing department X of a company and entity Y symbolizing department Y of the company. Both entities X and Y are located at the same hierarchy level of the company and accordingly mapped to the same access rights hierarchy level (here: the highest access rights hierarchy level), but have different tasks and rights and, accordingly, are assigned with differing access rights at their hierarchy level. Entity X has the rights A and B, which refer e.g., to databases and/or directories or other resources in the IT system 1. Entity Y has the access rights C, symbolizing different access rights compared to the access rights of entity X.

Both highest level entities X and Y have members at hierarchy levels below the highest hierarchy level. The entity U is positioned below entity X, i.e. at the higher access rights hierarchy level at which additional rights are defined, namely access rights D and E. For example, entity U is a project group within department X. Accordingly, entity U is specified as a member of entity X and inherits the access rights of entity U. Likewise, entity X has two members at the higher access rights hierarchy level, namely entity V und entity W. Again, entity V und entity W respectively may be a project group within department Y and is therefore equipped with additional access rights F at the higher hierarchy level, e.g. access to further databases or applications.

The exemplary access rights hierarchy scheme extends in the same manner to still a further hierarchy level, the lower access rights hierarchy level. Here, entities U, V and W have respective members at the lower access rights hierarchy level. Entities M and N, e.g. individual employees of the company being a member of the project group U and are assigned with further additional access rights at the lowest access hierarchy level, such as personal work space rights G and particular test access rights H for the project work. Both, entity M and entity N, additionally inherit the access rights of their memberships of the higher and the highest access rights hierarchy level. Similarly, entity O is a person of the project group V (e.g. the project group leader) and is therefore specified to be a member of entity V. Entity O is given further access rights (or restrictions) I, J, K at the lowest hierarchy level and likewise inherits the access rights from the higher and highest access rights hierarchy level. Entity P symbolizes a person of the project group W and is given access rights I and J, but—compared to entity O, not K.

Note that FIG. 2A is a simplified example for the purpose of illustration. In practice, the number of hierarchy levels, the number of entities at the various hierarchy levels, the definition and granularity of access rights, as well as the overall structure of the normalized database 3 may be significantly more complex. For example, an entity at the lower access rights hierarchy level may be a member of multiple entities of the higher access rights hierarchy level, an entity at the lower access rights hierarchy level may be a direct member of the highest access rights hierarchy level (without being a member of an entity at the higher access rights hierarchy level), entities at the same hierarchy level may be members of each other, and so on. The present methodologies are applicable to any one of these more complex structures.

Traditionally, the normalized database 3 is utilized to check access rights of access requesting entities at access request time. For example, if entity O requests access to a resource of the IT system 1, the normalized database 3 would be consulted to see whether or not entity O is permitted to access the requested resource. To determine the relevant access rights of entity O, the access rights of the higher and highest access rights hierarchy level would be propagated to and added to the explicitly specified access rights at the lower access right hierarchy level. For example, the resource requested by entity O requires access right F. To determine whether or not entity O has the access right F, the memberships of entity O are resolved and it is determined that entity V, which entity O is a member of, in fact equipped with access right F. Hence, entity O inherits the access right F from superordinate entity V and is allowed to access the requested resource. At another occurrence, entity O asks for a resource that requires access right A to accessed. Here, the complete access rights hierarchy is to be traversed including the highest access right hierarchy level in order to find out that entity O lacks the access right A as A is neither specified for entity O at the lowest access right hierarchy level nor for any one of the membership entities of entity O at the higher or highest access rights hierarchy levels.

To address this, the denormalized database 5 is provided. Different from the normalized database 3, the denormalized database 5 solely specifies access rights at a single hierarchy level, namely the access rights of all entities as specified in the normalized database 3 supplemented by the respective access rights derived from the higher access rights hierarchy levels and their corresponding own access rights. Hence, at access request time, it is sufficient to query the data record(s) specified for the requesting entity at the single hierarchy level, without resolving access rights derived from any higher access rights hierarchy level, as the latter ones are already explicitly stored for the requesting entity in the denormalized database 5. Hence, compared to utilizing the normalized database 3, granting or denying access based on the denormalized database 5 is rendered more efficient in terms of computation resources and response time. The term "denormalized" is utilized herein to express that the access rights are stored in the denormalized database 5 in the aforementioned flattened and consolidated manner with all native and inherited access rights in a single hierarchy level.

An illustrative example of the denormalized database 5 which makes reference to the aforementioned example of FIG. 2A is given by FIG. 2B. Entity M inherits access rights according to the membership chain from higher-level entities U and X. i.e. entity M is specified to have access rights A and B of entity X and the access rights D and E of entity U. The same access rights propagation applies to entity N, so that both entities M and N have the access rights A, B, D, E, G and H. Analogously, lower hierarchy level entity O inherits the access rights from the superordinated entities V and Y. Entity O thus is specified to have the access rights C, F, I, J and K, whereas the access control rights C and F are inherited from the entities Q and Y, respectively.

Further general aspects concern methodologies to transform access rights stored in the normalized database 3 into the flatted and consolidated representation of the denormalized database 5, in particular in the event of updates of access rights. Such updates include, for example, adding a new entity with initial access rights at any one of the access rights hierarchy levels, extending, modifying and/or revoking access rights of one or more existing entities at any one of the access rights hierarchy levels, changing memberships of entities at any one of the access rights hierarchy levels, adding or deleting access rights of one or more hierarchy levels, etc. The functionalities to transform the access rights from the normalized representation to the denormalized representation are realized by the computation module 4 (FIG. 1).

Figure 5:
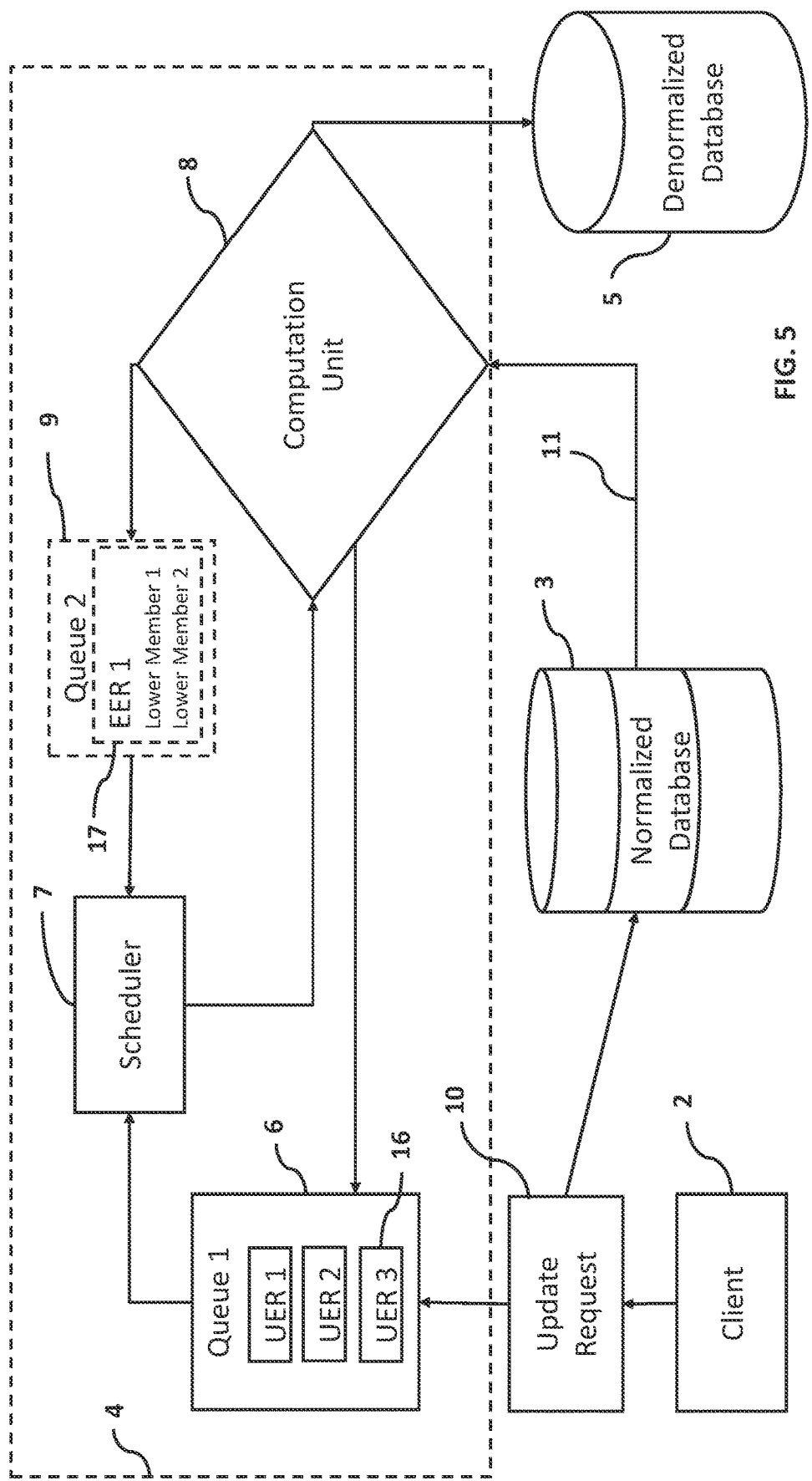
FIG. 5 shows elements of the information technology system at a refined level.

The computation module 4 may be implemented as a processing unit, a server running program code or any other computerized entity arranged to execute such commands. A more detailed view of the computation module 4 with exemplary functional sub-modules is shown by FIG. 5 and described further below. Generally, the operation of the computation module 4 is triggered by the reception of an update request from the client 2, as already indicated above, denoted as first update request 10 by the message sequence chart of FIG. 3. The first update request indicates an update of one or more access rights as mentioned before. For example, one of the existing entities of the higher access rights hierarchy level (e.g. a project group) is given an additional access right.

As visualized by FIG. 3, the first update request 10 (as well as any other update requests) is sent from the client 2 to the computation module 4 and to the normalized database 3. Various options are envisaged to implement this. For example, the first update request 10 may be received by the computation module 4 from the client and the computation module 4 may update the access rights in the normalized database 3 accordingly, e.g. by adding the new access right to the entity concerned. In other implementations, the first update request 10 is sent from the client 2 to the normalized database 3 and the computation module 4 receives or retrieves, in activity 11, a copy of the updated entity access rights by the normalized database 3. In still other variants, the first update request 10 is sent from the client simultaneously to both, the computation module 4 and the normalized database 3. In any event, the first update requests 10 effects a corresponding update of the access rights in the normalized database 3 and enables the computation module to transform this update into a flattened representation in the denormalized database 5. To this end, the computation module 4 computes, in activity 12, updated access rights at the lower level of the access rights hierarchy. For example, if the first update request 10 added an access right to an entity at the higher access rights hierarchy level, the computation 12 includes propagating this additional access right to all members of the entity at the higher access rights hierarchy level at the lower access rights hierarchy level. The updated access rights at the lower access rights hierarchy level are then stored in the denormalized database 5.

At a later point of time, a first access request 13 is issued by a user device 6 of an entity at the lower access level hierarchy level. The user device 6 which may be of any type of computerized user devices such as a smartphone, a personal computer, a tablet and/or an application. The first access request 13 seeks access (e.g. read or write access) to a particular resource in the IT system 1. The first access request 13 is served by using the denormalized database 5. The access rights of the access requesting entity are already explicitly pre-computed and the first access request 13 can be served instantaneously, without propagating access rights from the higher levels of the access rights hierarchy. The denormalized database 5 responds with a corresponding access response 14 allowing or denying the first access request 13. If access is allowed, the user device 6 may then proceed with actually accessing the particular resource of the IT system 1.

Utilizing the denormalized database 5 in this way provides technical benefits over known systems such as U.S. Pat. No. 6,772,350 B1. By transforming and assigning/inheriting the access rights of higher entities to entities of the lower hierarchy level, access control is simplified as calculating access rights dependencies can be avoided at access request time. The time needed to check whether an entity has access to a particular resource of the IT system 1 is reduced.

An example of an access right update for an entity on a higher hierarchy level is given by FIG. 4, partially re-using the introductory example of FIGS. 2A and 2B described above (FIG. 4 exemplarily relates to an access rights hierarchy with two hierarchy levels, the higher and the lower access rights hierarchy level). The normalized database 3 receives an update request 10 to update the access rights of an entity on the higher access rights hierarchy level, namely entity V (FIG. 2A). Entity V in the higher access rights hierarchy level already has the access right F, which e.g. specifies read and write access to a cloud application offered to the IT system 1. In addition, entity V is now provided with the access right L that grants access to a further resource, e.g. a local database of IT system 1.

The access right L is first added for entity V in the normalized database 3, i.e. entity V is specified to have access rights F and L. Subsequently, computation 12 (by the computation module 4) effects a mapping of this update in the normalized database 3 to the denormalized database 5. The access rights of entity V are propagated to all members of V, i.e. here to entity O. Accordingly, entity O is specified in the denormalized database 5 to have the previously assigned access rights F from entity V as well as the new access right L of entity V, and also the access rights I, J and K which are natively defined at the lower access rights hierarchy level of entity O. Optionally, assuming the denormalized database 5 maintains not only the access rights of the lower hierarchy level, but also those of higher hierarchy levels, the updated access rights of entity V are also stored in the denormalized database 5.

In non-limiting implementation examples, the inheritance of the access control rights for entities in the denormalized database 5 is implemented e.g. by means of factorization, i.e. the previously assigned access rights of an entity (e.g. entity V) at the higher hierarchy level are stored intermediately in a cache to be used again for each entity on a lower hierarchy level that is affected by the update request. The access rights L for the entity V for instance, are computed once and stored in the cache to be re-used for lower members. Then, the propagation of the access rights to lower members is effected by assigning the cached access rights to all entities below entity V (which is entity O in this exemplary embodiment) and are finally stored in the denormalized database 5. The cache may be a part of the computation module 4 and accessible by the computation unit 8 (FIG. 5). Maintaining updated access rights of intermediate and lower hierarchy levels affected the update request in the cache for at least a given time period, even after the update request has been processed by the computation module 4, provides access rights computation re-usage opportunities that can be beneficial in terms of efficient computation resource utilization.

In some embodiments, with reference to FIG. 5, the computation module 4 includes a scheduler 7, at least two processing queues, a first processing queue 6 and a second processing queue 9, to facilitate the computation 12 of updated access rights to be stored in the denormalized database 5. Moreover, a computation unit 8 such as one or more processors may be present to execute program instructions. Computing 12 the updated access rights includes storing, in response to updating the access right in the normalized database 3, a first update event record (FIG. 5: UER1) indicating the higher hierarchy level entity (the access rights of which are updated by the first update request 10 in the normalized database 3) in the first processing queue 6. Generally, at a time, the first processing queue 6 may store multiple update event records 16 at a time. Each update event record 16 may represent an update request, or logical parts of an update request, as will be described in more detail below.

The scheduler 7 is responsible for dequeuing the update event records stored in the first processing queue 6 in a particular order, in accordance with a given scheduling strategy. As explained further below, scheduling is, for example, based on priorities. Next, the scheduler 7 retrieves the first update event record from the first processing queue 6 and identifies, based on the indication in the first update event record, the one or more lower hierarchy level entities which are related to the higher hierarchy level entity. Then, the scheduler 7 retrieves the updated access rights of the higher hierarchy level entity and the access rights of the one or more lower hierarchy level entities from the normalized database 3. After that, a first entity event record (FIG. 5: EER1) is stored per corresponding lower hierarchy level entity including the retrieved updated access rights of the higher hierarchy level entity and the retrieved access rights of the one or more lower hierarchy level entities in the second processing queue 9. The retrieval of lower hierarchy level entities, in this sense, corresponds to creating a logical list of all affected lower hierarchy level entities and their corresponding access rights of the same update event record so that the computation unit 8 may process over the complete list. The scheduler 7 then retrieves the first entity event record from the second processing queue 9. Finally, the computation unit 8 maps the retrieved updated access rights of the higher hierarchy level entities to obtain updated access control rights of the one or more lower hierarchy level entities. Besides, in embodiments, the updated access control rights may also be stored in the cache (as already mentioned above) to be used multiple times for other members on a lower hierarchy level or at the same hierarchy level or even other update event records including the same members. Finally, the updated access rights of the higher hierarchy level entity and the one or more lower hierarchy entities are then stored in the denormalized database 5 as already mentioned above. Update event records and/or entity event records may include various information such as identifications of the respective entity concerned, access rights of the entity concerned (either as explicit data or a in form of a reference to e.g. the cache or the normalized database 3), as well as further control data such as a priority and/or a time stamp as described further below.

In some embodiments, a second scheduler or even more schedulers may be present to parallelize the process. Multiple schedulers may be implemented by sub-modules of the scheduler 7 as described above (e.g. a scheduler with multiple processing cores) or additional schedulers at the same level as scheduler 7. For example, an update request is received to update the access rights of the highest hierarchy level entity. The scheduler 7 retrieves the higher hierarchy level entities and a second scheduler may retrieve the lower hierarchy level entities of a higher hierarchy level entity. For example, each processing queue 6, 9 may be equipped with a corresponding scheduler allowing simultaneous dequeuing activities over the number of processing queues. In addition, or alternatively, multiple schedulers may be present per processing queue allowing simultaneous dequeuing activities per processing queue. Such embodiments may be particularly used for update event records with more than two hierarchy levels. In combination with further processing queues, as explained below, the whole process can be parallelized to speed up the whole process.

In some embodiments, the second processing queue 9 has the purpose to divide the hierarchy tree of the update event records (UERs) in the first processing queue 6 to individual hierarchy levels, i.e. after the identification of the one or more lower hierarchy level entities which are related to the higher hierarchy level entity, event records for affected lower members of the UER1 are queued in the second processing queue 9 and are processed before the next UER2 in the first processing queue 6 to facilitate successful completion of processing UER1 before the next event is processed. Accordingly, the recursive calculation of the one or more lower hierarchy level entities which are related to the higher hierarchy level entity are prioritized over the next UER2 and that the calculation of the access rights goes from top to bottom of the hierarchy level entity. In embodiments, event records for still lower hierarchy level entities may also be outsourced in further separate processing queues, e.g. to parallelize the update process or to separate the processes in cases where the hierarchy structure is greater than two hierarchy levels.

Figure 4:
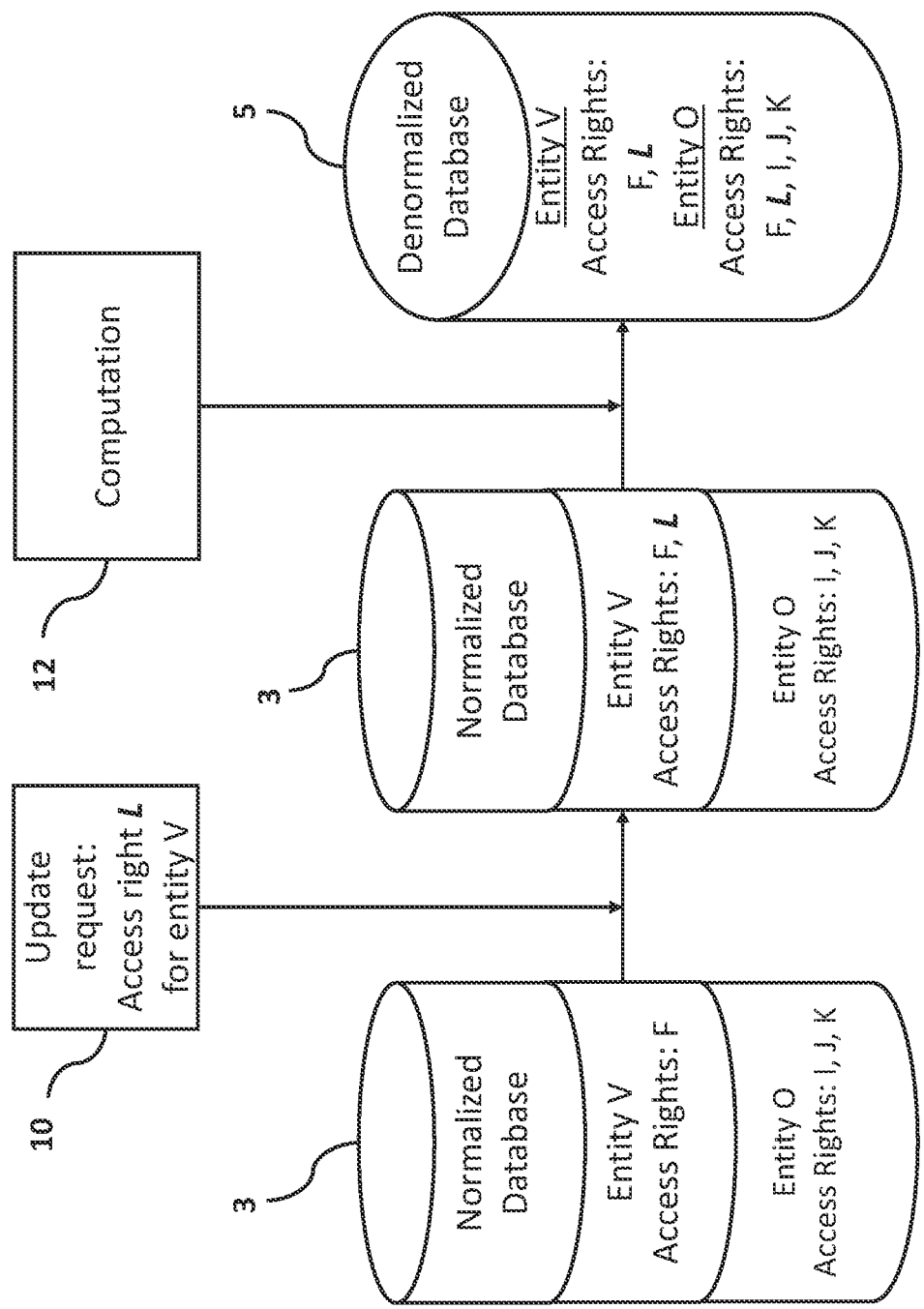
FIGS. 4 and 7 visualize exemplary access rights updates by the present methodologies.
Figure 6:
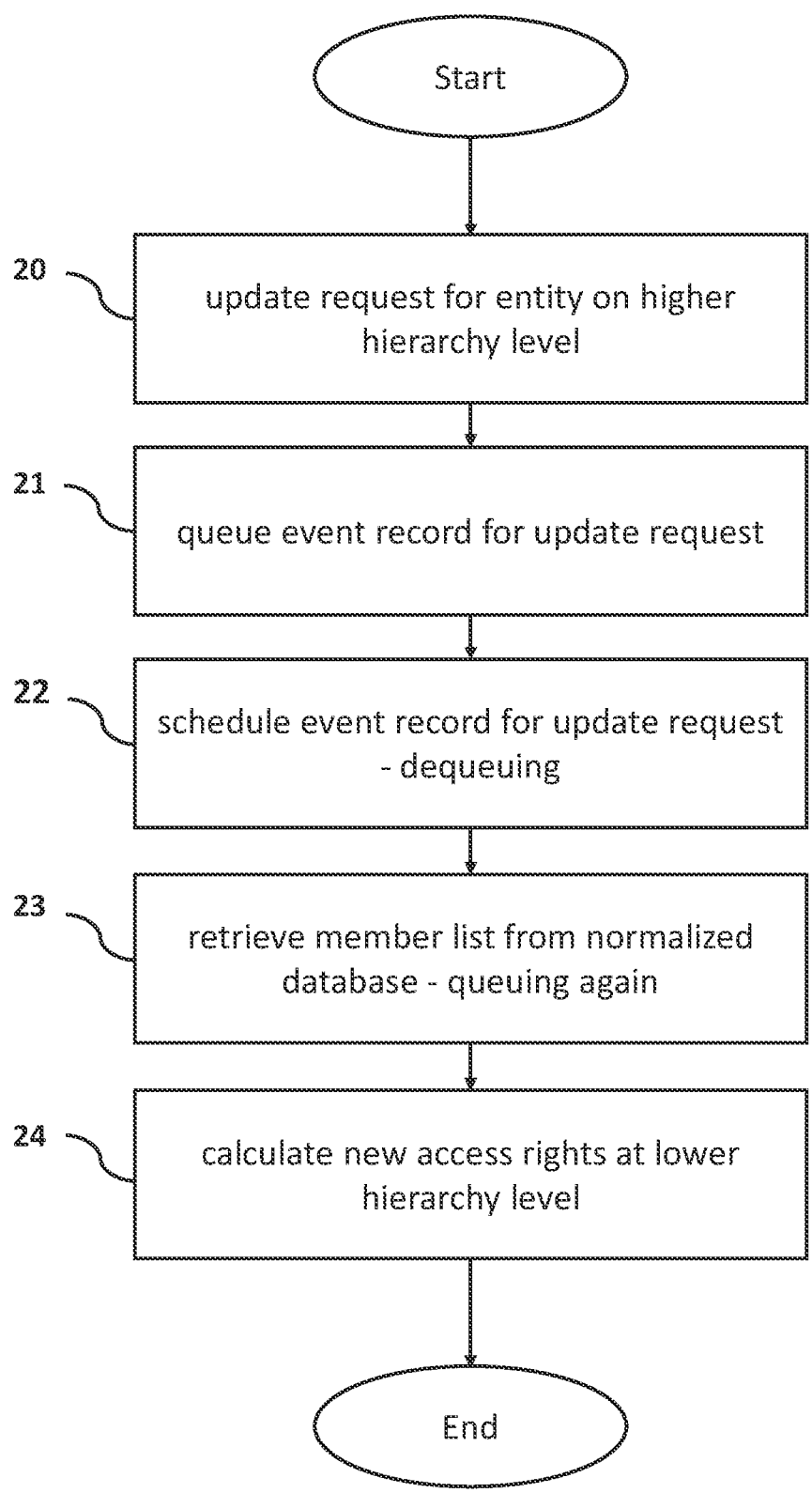
FIG. 6 is a flowchart with the present methodologies at a refined level of abstraction.

A flow chart of this procedure according to embodiments is shown by FIG. 6. Firstly, at 20, an update request (the first update request 10) is sent by the client 2 to update the access rights of an entity at the higher hierarchy level, e.g. entity V (FIG. 4). Correspondingly updated access rights are stored in the normalized database 3, in the cache and, at the same time, an update event record is stored, at 21, in the first processing queue 6. The update event record may include the same information as the update request 10, in particular the higher hierarchy level entity concerned as well as the updated (added, modified, revoked, etc.) access rights.

At a later point of time, potentially after having processed other update event records in the meantime, at 22, the scheduler dequeues the update event record for the first update request in order to calculate the corresponding access rights at the lower hierarchy level. To this end, the members of the higher hierarchy level entities (e.g. entity V) at the lower hierarchy level (e.g. entity O) are identified and stored as the first entity record per corresponding lower hierarchy level entity in the second processing queue 9 to be updated accordingly. This may be implemented by the computation unit 8 retrieving, in 23, the data record specifying the access rights from cache and the memberships and members of the higher hierarchy level entity (e.g. entity V, cf. FIG. 2A) from the normalized database 3.

At 24, the computation unit 8 calculates the updated access rights for the entities at the lower access rights hierarchy level (e.g. entity O), as already explained above with reference to the example of FIG. 4.

As already mentioned above, in some embodiments, the access rights hierarchy comprises further hierarchy levels beyond the higher and the lower hierarchy level, such as a highest hierarchy level. Hence, the plurality of entities include a highest hierarchy level entity (e.g. entities X and Y of FIG. 2A). Higher hierarchy level entities (e.g. entities U and V of FIG. 2A) may be a member of one or more highest hierarchy level entities and thus inherit access rights of the highest hierarchy level entity.

In such access rights hierarchies with three or more hierarchy levels, the computation 12 of the updated access rights may process any one of the hierarchy levels. Generally speaking, the computation 12 may include an identification, based on the indication in the first update event record, of the highest hierarchy level entity, a retrieval of the access rights of the highest hierarchy level entity from the normalized database 3 and mapping the retrieved access rights of the highest hierarchy level entity to the updated access control rights of the higher hierarchy level entity. Processing the whole chain of entities of the various access rights hierarchy levels may facilitate processing multiple access rights updates (due to multiple update requests) across entities located on different levels of the access rights hierarchy at the same time as processing also the superordinate entities may cover any access rights updates on higher access rights hierarchy levels as well. This will be described in more detail in the following.

In some embodiments, in addition to the first update request 10 concerning an access right update of an entity at the higher access rights hierarchy level, a second update request 15 is received from the client 2 to change access rights of a highest hierarchy level entity, in particular a highest hierarchy level entity having the entity at the higher access rights hierarchy level referred to by the first update request 10 as a member. As usual, the access rights of the highest hierarchy level entity are updated in the normalized database 3. The computation 12 of the updated access rights of updated access rights for the one or more lower hierarchy level entities also includes a computation of the updated access rights of the higher hierarchy level entity as being a member of the corresponding highest hierarchy level entity.

Figure 7:
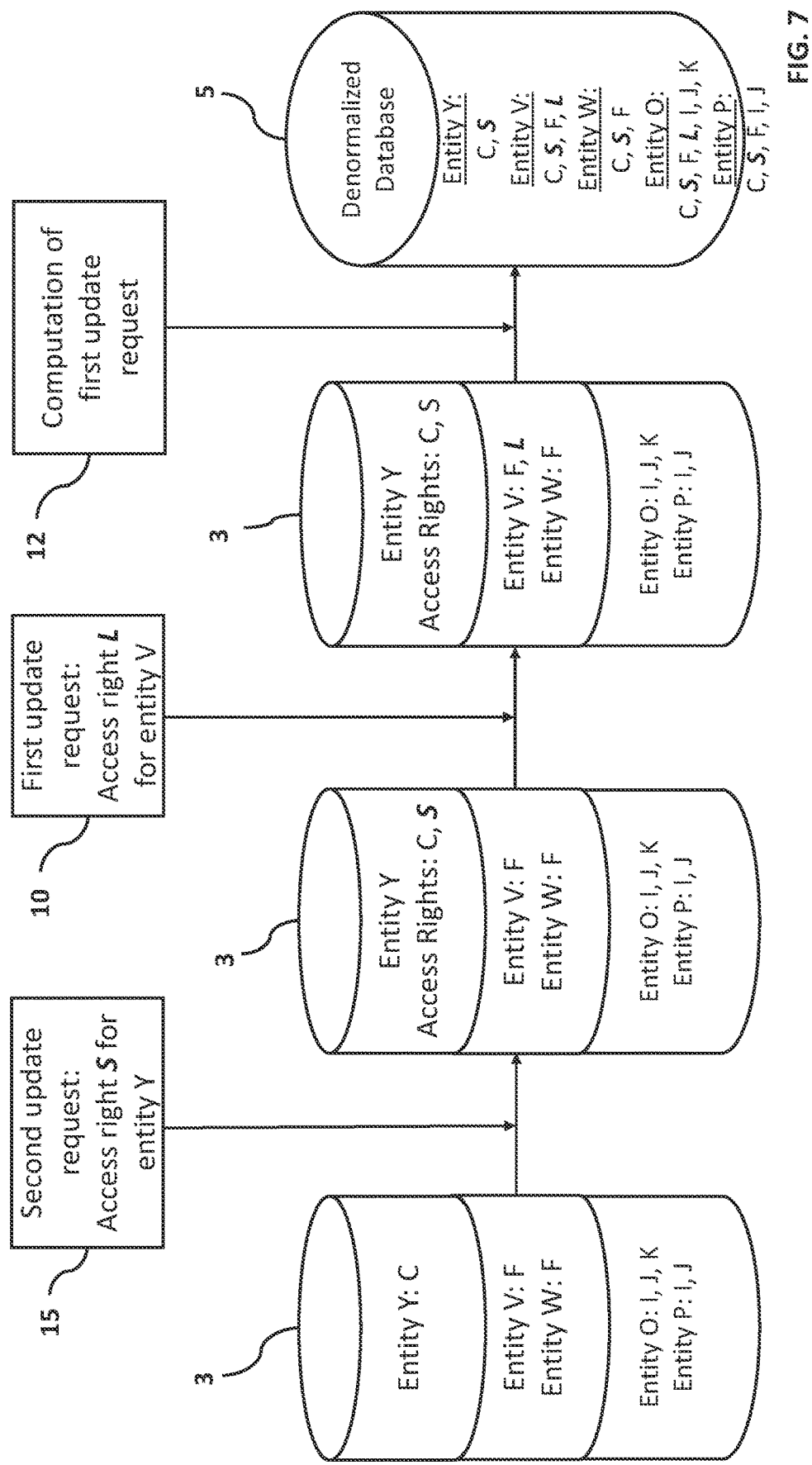
Figure 8:
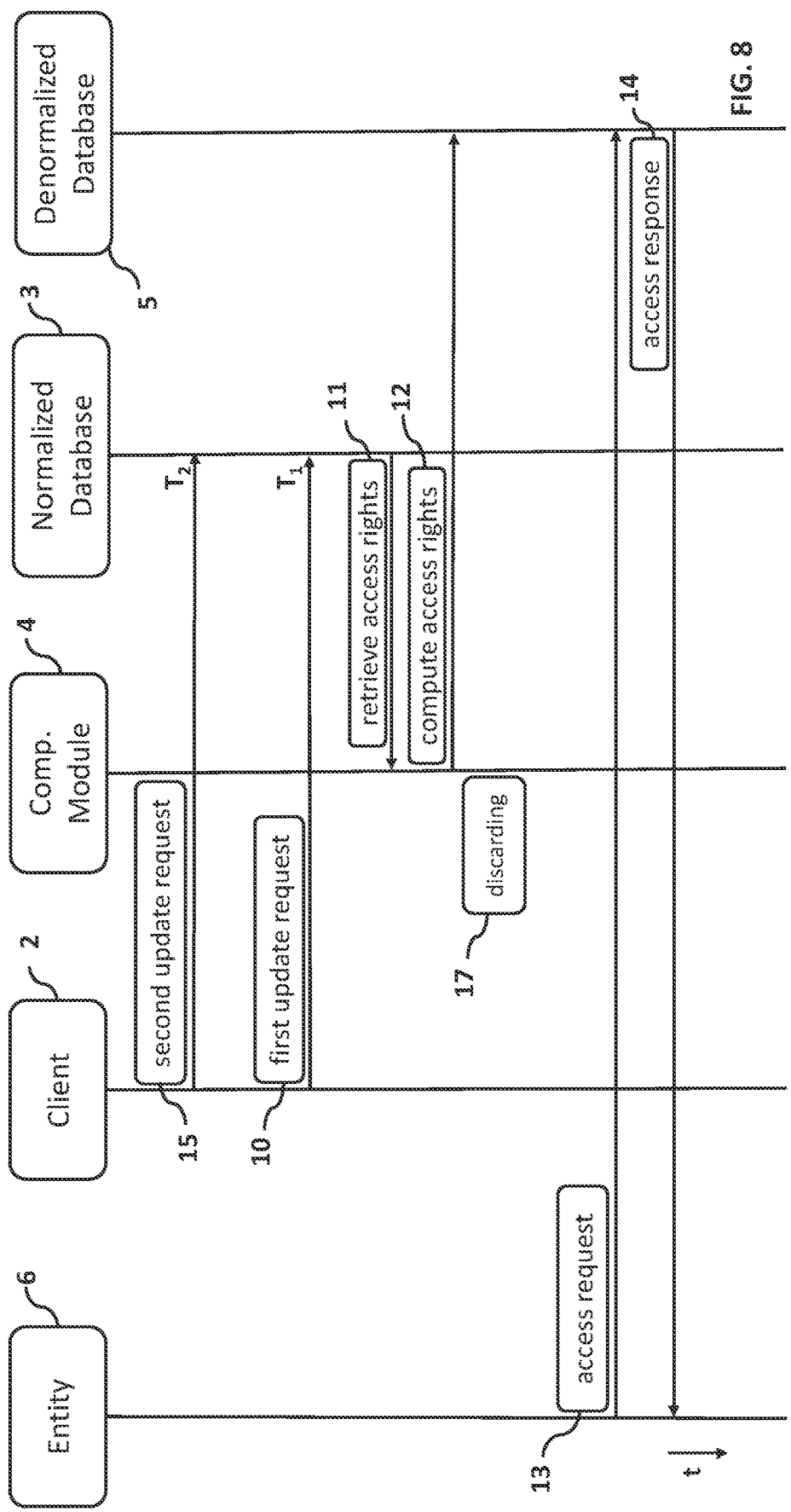
FIG. 8 shows a refined message sequence chart for denormalized access rights computation.

An example of this is given by FIG. 7 which re-uses and extends the example of FIG. 4. Reference is also made to FIG. 8 showing a message sequence chart that may implement the same example. Like in FIG. 4, the first update request 10 is received which indicates an additional access right L for higher hierarchy level entity V. The update is realized in the denormalized database 3. As explained above, a corresponding first update event record may be queued 21 in the first processing queue 6 (FIG. 5). At an earlier point of time, a second update request 15 was received which indicates that highest hierarchy level entity Y is to be assigned an additional access right S. Again, the access rights of entity Y were updated in the normalized database 3. As will be explained in more detail further below, a corresponding second event record may be queued 21 in the first processing queue 6 for the second update request 15.

At a later point of time, the first update request 10 is processed by the computation module 4 in order to update the denormalized database 5 accordingly. As explained, this may be realized by way of the scheduler 7 which dequeues 22 the corresponding first event record from the first processing queue 6 based on the given scheduling strategy. As explained above, processing the first update request 10 then involves processing the complete access rights hierarchy, as follows: The data record specifying the memberships, members and access rights of the entity concerned by the first update request 10, here: entity V, is retrieved 11 from the normalized database 3. The data record indicates that entity V is a member of highest hierarchy level entity Y. Hence, the computation module 4 also retrieves 11 the data record specifying the members and access rights for highest hierarchy level entity Y from the normalized database 3 to add them in the second processing queue 9. The scheduler 7 then dequeues the second processing queue 9 based on the given scheduling strategy. The computation of the flattened and consolidated access rights representation for the denormalized database 5 is then based on both, the access rights of the highest hierarchy level entity Y and the access rights of the higher hierarchy level entity V. Finally, the updated access rights of the one or more corresponding higher hierarchy level entities and the corresponding lower hierarchy level entities are stored in the denormalized database 5 beside the updated access rights of the addressed entity in the update request.

In other words, the computation 12 includes a complete propagation of the highest access rights hierarchy level entity Y via the higher access rights hierarchy level (i.e. members of entity Y which are entities V and W) down to the lower access rights hierarchy level (i.e. members of the members of entity Y and member of the entity W). In the present example, the access rights of highest access rights hierarchy level entity Y (C, S) are propagated onto higher hierarchy level entity V and further propagated onto lower hierarchy level entity O which is the member of entity V, as well as propagated onto higher hierarchy level entity W and further propagated onto lower hierarchy level entity P which is a member of entity W. Hence, at the lower access rights hierarchy level reflected in the denormalized database 5, the entity O is specified to have the access rights C and S (inherited from entity Y via entity V), the access rights F and L (inherited from entity V) and the access rights I, J, K being natively defined for the entity O at the lower access rights hierarchy level. Likewise, the entity P is specified to have the access rights C and S (inherited from entity Y via entity W), the access right F (inherited from user W) and the access rights I and J being natively defined for the entity P at the lower access rights hierarchy level. Note that entity P is not given access right L because entity P is not a member of entity V, but of entity W which was not granted the additional access right L by the first update request 10. In this manner, a single instance of the computation 12 effectively transforms both, the first update request 10 and the second update request 15, to the flattened and consolidated access rights representation in the denormalized database 5, thereby constituting a computing-resource-efficient procedure.

Generally referring back to FIG. 5, the aforementioned processing of the complete hierarchy to efficiently compute multiple update requests at once, may again be implemented in embodiments using the first processing queue 6 storing update event records 16, the second processing queue 9 storing entity event records including the lower members affected by the update event records 16 and the scheduler 7. Generally, an update event record is stored in the first processing queue 6 for any received update request 10, 15, irrespective of which one or more entities on which levels of the access rights hierarchy are addressed by the update request 10, 15. In the example of FIGS. 4, 7 and 8, a first update event record (FIG. 5: UER 1) is generated and stored in the first processing queue 6 for the first update request 10 and a second update event record (FIG. 5: UER 2) is generated and stored for the second update request 15 in the first processing queue 6. The scheduler 7 is arranged to dequeue the update event records from the first processing queue 6 sequentially according to the scheduling strategy employed, in order to process the update requests 10, 15 one after the other.

Accordingly, in various embodiments, processing the first update request 10, i.e. the computation 12 of updated access control rights for the higher hierarchy level entities and the members of the lower access rights hierarchy level is based on the first update event record. The scheduler 7 retrieves the first update event record from the first processing queue 6 for processing. The computation unit 8 identifies, based on the indication in the first update event record, the entities that are affected by the access right update in the normalized database 3 caused by the first update request 10 over all hierarchy levels. In case that there are any lower members of the entity addressed by the update request, then corresponding entity event records are stored in the second processing queue 9. To this end, the computation unit 8 retrieves the data records relating to the affected highest hierarchy level entity (e.g. entity Y being the superordinate entity of entity V referred to by the first update request 10), the higher hierarchy entities (e.g. entity V referred to by the first update request 10 as well as entity W which is a member of affected entity Y), and the affected entities on the lowest hierarchy level (entity O being member of entity V and entity P being member of entity W) from the normalized database 3. The retrieved data records indicate the current access rights of the affected entities at the various access rights hierarchy levels. The computation 12 of the consolidated access rights for the affected lower hierarchy level entities is then e.g. given by summing the access rights of the respective lower hierarchy level entities with the access rights of all the superordinate entities at the hierarchy levels above the lower hierarchy level entity, e.g. Denormalized Access Right (entity O)=Normalized Access Rights (entity O)+Normalized Access Rights (entity V)+Normalized Access Rights (entity Y) as well as Denormalized Access Right (entity P)=Normalized Access Rights (entity P)+Normalized Access Rights (entity W)+Normalized Access Rights (entity Y). The access rights of higher entities are computed analogously. e.g. Denormalized Access Right (entity V)=Normalized Access Rights (entity V)+Normalized Access Rights (entity Y) as well as Denormalized Access Right (entity W)=Normalized Access Rights (entity W)+Normalized Access Rights (entity Y).

In a next iteration, the scheduler 7 retrieves the second update event record from the first processing queue 6, the second update event record representing the second update request 15, as mentioned above. The computation unit 8 identifies, the higher hierarchy level entity and the updated access rights (derived from the highest hierarchy level entity, e.g. entity Y) based on the indication in the second update event record (e.g. entity V). The computation unit 8 then identifies the corresponding members of the higher hierarchy level entity which are related to the at least one highest hierarchy level entity like before for the previous update event. e.g. by retrieving 11 the data record and their current states, i.e. the current status of their access rights, of the higher hierarchy level entity from the normalized database 3 or from the cache, if available there. Likewise, as described above for the first update event record 10, the higher hierarchy level entities are then stored as second entity event records per corresponding higher hierarchy level entity including the updated access rights of the highest hierarchy level entity (e.g. entity Y) and the retrieved access rights of the one or more higher hierarchy level entities (e.g. entity V) in the second processing queue 9. According to the third hierarchy level, it is checked again whether there are other entities on lower hierarchy levels that are affected by the update request. Subsequently, the scheduler 7 retrieves the second entity event record from the second processing queue 9 and the computation unit 8 then, again, identifies the one or more lower hierarchy level entities which are related to the one or more hierarchy level entities. The identified lower hierarchy level entities are stored as respective third entity event records per corresponding lower hierarchy level entity including the retrieved updated access rights of the higher hierarchy level entity (e.g. entity V) and the retrieved access rights of the one or more lower hierarchy level entities (e.g. entity O) in the second processing queue 9. The scheduler 7 retrieves the third entity event record from the second processing queue 9 and maps the updated access rights of the higher hierarchy level entity and the access rights of the one or more lower hierarchy level entities to obtain the updated access rights of the one or more corresponding lower hierarchy level entities.

Hence, in this manner, the first update request 10 and the second update request 15 are processed over the complete access rights hierarchy. Both update requests refer to different entities at different hierarchy levels and are received at a different time. In the exemplary scenario of FIG. 7, computation 12 involves processing the first update event record reflecting the first update request 10 by identifying all entities across the access rights hierarchy, retrieving the respective access rights of the identified entities from the normalized database 3 and calculating the consolidated denormalized access rights for the identified entities at the lowest access rights hierarchy level. Generally, to address the update of all the lower entities in the entity hierarchy, an iterative calculation loop is performed wherein the first iteration considers the higher hierarchy level with the higher hierarchy level entities concerned and the next iteration considers the one or more corresponding lower hierarchy level entities. At each iteration, updated access rights are determined for the entities concerned which are stored (e.g. in a cache) as intermediate results. These intermediate results are then used to calculate the one or more corresponding still lower hierarchy level entities at the next iteration. In summary, each iteration includes determining the entities affected by the update at the presently considered entity hierarchy level as well as calculating the updated access rights of the affected entities.

In some embodiments, the update event records stored in the first processing queue 6 contain a priority and the scheduling strategy of the scheduler 7 to dequeue the update event records from the first processing queue 6 is based on the priority. Hence, the first update event record and the second update event record may have different priorities which are utilized to control at which point of time an update event record is processed, compared against potentially other update event records stored in the first processing queue 6 at the respective time.

More specifically, the scheduler 7 prioritizes the retrieval of the first update event record and the second update event record based on the priority. The priority of an update event record 16 in the first processing queue 6 determines the order of processing by the computation unit 8. An update event record with a higher priority is dequeued and processed before an update event record with a lower priority. The priority of an update event record 16 is set at the time of queuing the update event record and may depend on various factors such as the hierarchy level of the entity to which the underlying update request 10, 15 refers and/or the entity indicated by the update event record 16 belongs to, whether or not the update event record 16 was triggered by an update request 10, 15 or was the intermediate result of a computation 12 (as described above), the entity indicated by the update event record (e.g. particular entities may be defined as priority entity over other non-priority entities), and others. Note that, the second processing queue 9 includes the members of an entity identified by an update event record (referred to as entity event record) and therefore inherit the same timestamp and priority of the higher hierarchy member (s) addressed by the update request. Logically, these entity event records have a higher priority compared to following update event records. Hence, in these embodiments, the access rights of all members in the hierarchy of the update event are calculated with priority before the members of a further update event record (with lower priority).

Moreover, in various embodiments, the priority of update event records 16 referring to higher hierarchy level entities is generally set higher than the priority of update event records referring to highest hierarchy level entities. Accordingly, in the aforementioned examples, the priority of the first update event record (relating to a higher hierarchy level entity, e.g. entity V) is set higher than the priority of the second update event record (relating to a highest hierarchy level entity, e.g. entity Y). In this way, update event records which start a propagation of updated access rights in upward direction through the access rights hierarchy (such as the first update event record) and update event records that finally effect the computation of the updated access rights of the lower hierarchy level entities are dequeued by the scheduler 7 in a prioritized manner, thereby rendering the overall computation 12 more efficient in terms of time required to keep the denormalized database 5 synchronized with the normalized database 3. In some embodiments, the priority may be defined according to the number of entities affected by the update event, i.e. the more entities being potentially affected by an update event, the higher the priority of the corresponding event record is set. For example, an update event record relating to a higher hierarchy level (e.g. entity V) entity with only one member in the lower hierarchy level may be prioritized over an entity at the same hierarchy level (e.g. entity U), but with multiple entities in the lower hierarchy level. By this way, update events with a smaller number of entities involved can be processed quickly and instantaneously reflected in the denormalized database 5.

In various embodiments, the update event records 16, including the first update event record and the second update event record, comprise a time stamp indicating a point of time of the storage of the respective update event record 16 in the first processing queue 6. The timestamp facilitates scheduling and discarding update event records from the first processing queue 6. When scheduling the update event records and subsequent identifying the one or more corresponding higher/lower hierarchy level entities, the timestamp of the corresponding update event record is inherited to the entity event record, e.g. the first entity event record stored in the second processing queue 9 inherit the priority and the time stamp of the first update event record in the first processing queue 6 and the second entity event record and the third entity event record inherit the priority and the time stamp of the second update event record.

For example, the first update request 10 (e.g. concerning entity V) is received at a first point of time ($T_1$) and the second update request 15 (e.g. concerning entity Y) is received at a second point of time ($T_2$) which is before the first point of time, such that both, the first update event record and the second update event record are stored in the first processing queue 6 and the time stamp of the first update event record indicates time $T_1$ which is a later point of time than the time stamp of the second update event record, namely $T_2$. The scheduler 7 retrieves the first update event record based on the priority of the first update event record and the priority of the second update event record, because the priority of the first update event record— although the first update request 10 was received later than the second update request 15—is higher than the second update event record. In an embodiment with multiple processing queues, the second update event record may also be retrieved in parallel by the scheduler, so that the first update event record and the second update event record are queued in processing queues. Furthermore, after first identifying the superordinate entity at the highest hierarchy level and its current access rights as described above (e.g. entity Y), and after identifying the one or more corresponding lower hierarchy level entities (e.g. entity O) in the first update event record, the first entity event record is retrieved based on the priority of the first entity event records inherited from the first update event record and the priority of the third entity event records inherited from the second update event record from the second processing queue 9, and the updated access rights of the higher hierarchy level entity and the access rights of the one or more lower hierarchy level entities are mapped to obtain updated access rights of the one or more corresponding lower hierarchy level entities as already explained in detail above. Now, when retrieving the second update event record and subsequently retrieving the second entity event record and the third entity event record as described further above, the third entity event record is discarded 17 from the second processing queue 9 (FIG. 8). Discarding 17 is based on the time stamp of the first entity event record and the time stamp of the third entity event record, which indicate that the third entity event record is older than the first entity event record. Since the first entity event record concerned an update of access rights of the lower hierarchy level entity (e.g. entity O), and this access right update of the lower hierarchy level entity was already transformed into the denormalized database 5 by computation 12 of the first update request and first update event record (because the lower hierarchy level entity referred to be in the first update request 10 is a member of the highest hierarchy level entity referred to by the second update request 15, e.g. Y), the older third entity event record has been rendered moot and does not need to be processed anymore. Hence, computation efficiency of the overall transformation of the normalized access rights representation into the flattened/complete access rights representation in the denormalized database 5 is additionally promoted.

In some embodiments with at least two hierarchy levels, the discarding of an update event record or entity event record may also occur as follows. For example, a first update request is received to change the access rights of entity U at time $T_1$ and the second update request is received at time $T_2$ which is after the first time $T_1$ to update the access rights of entity M, which is a lower member of entity U (cf. FIG. 2A). Regardless of their receiving time, both update requests are processed accordingly and the access rights are updated of the corresponding hierarchy level entities in the normalized database 3. Both update event records are then stored in the first processing queue 6 with their respective priorities and time stamps. The priority of the second update request is set higher than the first update request, because e.g. entity M is in a lower hierarchy level than entity U (e.g. because the second update request refers to the lower hierarchy level and thus affects less entities than the first update request being located on the higher hierarchy level). In this case, based on the priorities set in the corresponding queued update event records, the scheduler 7 prioritizes the second update request with a later time stamp over the first update request with an earlier time stamp. The scheduler 7 dequeues the second update event record from the first processing queue 6 and the computation unit 8 processes the second update event record. To maintain access rights consistency, processing the second update event record involves identifying any superordinate entities of the entity of the second update event record (i.e. entity U being the superordinate entity at the higher hierarchy level of entity M at the lower hierarchy level), retrieving the access rights of the identified higher hierarchy level entities and mapping the current access rights of the identified superordinate entity as defined in the normalized database 3 onto the updated access right of the lower hierarchy level entity as indicated by the second update request on top of the native access rights of the lower hierarchy level entity as specified by the normalized database 3. Once the process finished and the updated access rights of entity M along with the timestamp indicating $T_2$ are stored in the denormalized database 5, the first update event record (and first entity event record) is dequeued and processed. Now, the computation unit 8 generates first entity event records containing all lower hierarchy members of entity U (e.g. entity M and entity N) and queues the first entity event records e.g. in the second processing queue 9. At a next iteration, the first entity event records are to be scheduled. e.g. starting with the entity event record of entity M. The computation unit 8 checks the timestamp of the first entity event records and then determines that entity M of this first entity event record has a newer timestamp (indicating $T_1$) than time $T_2$ of entity M in the denormalized database 5, and therefore the computation of entity M may be discarded as the access rights update of the lower hierarchy level user M in the denormalized database 5 was already effected beforehand by way of processing the second update event record. Entity N is processed normally and stored in the denormalized database 5 afterwards.

Figure 9:
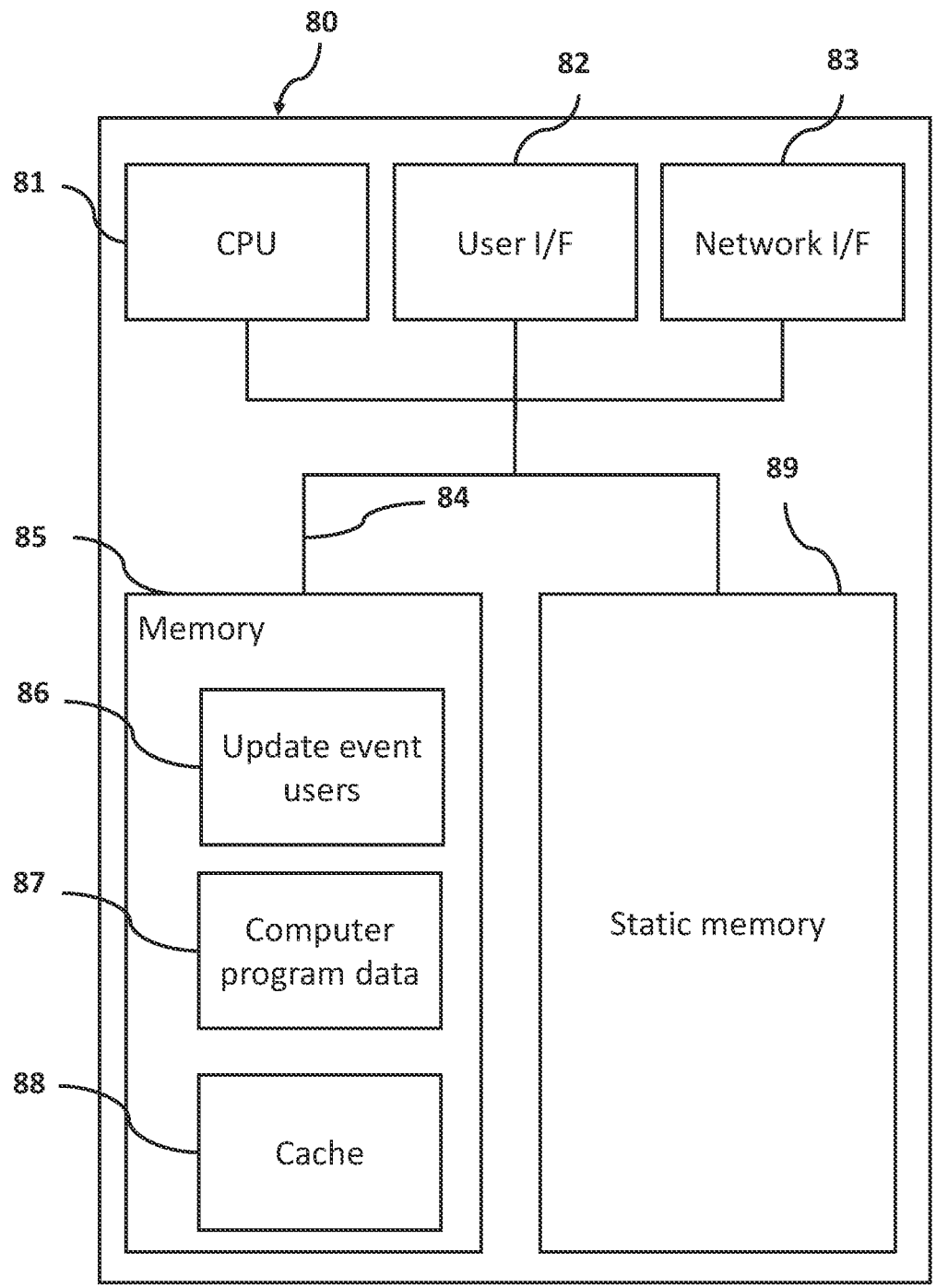
FIG. 9 illustrates an internal structure of the computation module implementing the present functionalities.

FIG. 9 is a diagrammatic representation of the internal components of a computing machine 80 implementing the functionality of the computation module 4. Similar servers may also realize one or more clients 2 in parallel described further above. The computing machine 80 includes a set of instructions to cause the computing module 3 to perform any of the methodologies discussed herein when executed. The computing machine 80 includes at least one processor 81, a main memory 85 and a network interface device 83 which communicate with each other via a bus 84. Optionally, the computing machine 80 may further include a static memory 89 and a disk-drive unit. A video display, an alpha-numeric input device and a cursor control device may be provided as examples of user interface 82. The network interface device 83 connects the server 80 including the computation module 4 to the other components of the information technology system 1 such as the client 2, the normalized database 3 and denormalized database 5 or any further components.

The computing machine 80 includes a memory 85 such as main memory, random access memory (RAM) and/or any further volatile memory. The main memory 85 may store temporary program data to facilitate the functionality of the computation module 4. For example, the computation module 4 may maintain already transformed and calculated access right controls to speed up the calculation process by being readily available in the cache 88. The main memory 85 may also store computer program data 87 that are needed for the new access rights calculation. The memory 85 may also temporarily store the entities of one the two processing queues 86 of the computation module 4 and/or updated entity access rights that are forwarded and stored in the denormalized database 5.

A set of computer-executable instructions (computer program code 87) embodying any one, or all, of the methodologies described herein, resides completely, or at least partially, in or on a machine-readable storage medium, e.g., the memory 85. For example, the instructions 87 may include software processes implementing the database request processing functionality of the computation module 4. The instructions 87 may also implement the functionality of receiving and responding to database requests from the client 2 and filter data records from the normalized databases 3.

The instructions 87 may further be transmitted or received as a propagated signal via the Internet through the network interface device 83 or via the user interface 82. Communication within computing machine is performed via a bus 84. Basic operation of the computation module 4 is controlled by an operating system which is also located in the memory 85, the at least one processor 81 and/or the static memory 89.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

The invention claimed is:

1. An access control method performed in an information technology system comprising a normalized access control database and a denormalized access control database, wherein the normalized access control database stores access rights of a plurality of entities in an entity hierarchy with at least two hierarchy levels, a higher hierarchy level and a lower hierarchy level, wherein the plurality of entities comprise higher hierarchy level entities of the higher hierarchy level and lower hierarchy level entities at the lower hierarchy level, and the denormalized access control database stores the access rights of the higher hierarchy level entities and the lower hierarchy level entities, the method comprising:
   receiving a first update request from a client to change the access rights of at least one higher hierarchy level entity;
   updating the access rights of the at least one higher hierarchy level entity in the normalized access control database;
   computing updated access control rights for one or more corresponding lower hierarchy level entities which are related to the at least one higher hierarchy level entity corresponding to the updated access rights;
   storing the updated access rights of the one or more lower hierarchy level entities in the denormalized access control database;
   storing the updated access rights of the at least one higher hierarchy level entity in the denormalized access control database; and
   serving an access request from one of the one or more lower hierarchy level entities on the basis of the updated access rights at the lower hierarchy level stored in the denormalized access control database.

2. The method of claim 1, wherein the information technology system comprises a scheduler and at least two processing queues, a first processing queue and a second processing queue, and computing the updated access rights comprises:
   storing, in response to updating the access rights of the at least one higher hierarchy level entity in the normalized access control database, a first update event record indicating the higher hierarchy level entity in the first processing queue;
   retrieving, by the scheduler, the first update event record from the first processing queue and identifying, based on the indication in the first update event record, the one or more corresponding lower hierarchy level entities which are related to the at least one higher hierarchy level entity;
   retrieving, by the scheduler, the updated access rights of the higher hierarchy level entity and the access rights of the one or more corresponding lower hierarchy level entities from the normalized access control database;
   storing a first entity event record per corresponding lower hierarchy level entity including the retrieved updated access rights of the higher hierarchy level entity and the retrieved access rights of the one or more lower hierarchy level entities in the second processing queue; and
   retrieving, by the scheduler, the first entity event records from the second processing queue and mapping the updated access rights of the higher hierarchy level entity and the access rights of the one or more lower hierarchy level entities to obtain updated access rights of the one of more corresponding lower hierarchy level entities.

3. The method of claim 2, wherein the first update event record and the further update event records comprise a time stamp indicating a point of time of the storage in the first processing queue.

4. The method of claim 3, wherein the first update event record and any further update event records comprise a priority, wherein the first entity event records stored in the second processing queue inherit the priority and the time stamp of the first update event record and wherein the scheduler prioritizes the retrieval of the first update event records an further update event records based on the priority and prioritizes the retrieval of the first entity event record and the further entity event records from the second processing queue based on the priority.

5. The method of claim 4, further comprising:
   receiving a second update request from the client to change the access rights of the lower hierarchy level entity, wherein the first update request is received at a first point of time and the second update request is received at a second point of time which is later than the first point of time,
   updating the access rights of the at least one higher hierarchy level entity in the normalized access control database;
   storing a second update event record for the lower hierarchy level entity in the first processing queue, the second update event record indicating the lower hierarchy level entity and having set the priority higher than the priority of the first update event record such that both, the first update event record and the second update event record are stored in the first processing queue with the time stamp of the first update event record indicating an earlier point of time than the time stamp of the second update event record;
   retrieving, by the scheduler, based on the priority of the first update event record and the priority of the second update event record, the second update event record from the first processing queue;

identifying, based on the indication in the first update event record, the corresponding higher hierarchy level entity which is related to the lower hierarchy level entity;

retrieving, from the normalized access control database, the access rights of the identified higher hierarchy level entity;

mapping the retrieved access rights of the higher hierarchy entity to the updated access control rights of the lower hierarchy entity;

storing the updated access rights of the one or more lower hierarchy level entities in the denormalized access control database;

in response to retrieving, by the scheduler, based on the priority of the first entity event records, the first entity event records from the second processing queue, discarding, based on the time stamp of the first entity event records inherited from the first update event record, the first entity event record indicating the lower hierarchy level entity from the second processing queue.

6. The method of claim 2, wherein the entity hierarchy comprises a highest hierarchy level and the plurality of entities comprise a highest hierarchy level entity, and wherein the higher hierarchy level entity is a member of the highest hierarchy level entity inheriting access rights of the highest hierarchy level entity and the one or more lower hierarchy level entities are members of the higher hierarchy level entity inheriting the access rights of the higher hierarchy level entity, and wherein computing the updated access rights further comprises:

identifying, based on the indication in the first update event record, the highest hierarchy level entity;

retrieving, from the normalized access control database, the access rights of the highest hierarchy level entity; and mapping the retrieved access rights of the highest hierarchy level entity to the updated access control rights of the higher hierarchy level entity.

7. The method of claim 6, further comprising:

receiving a second update request from the client to change the access rights of the highest hierarchy level entity;

updating the access rights of the highest hierarchy level entity in the normalized access control database;

wherein computing updated access rights for the one or more lower hierarchy level entities comprises computing updated access rights for the one or more corresponding higher hierarchy level entities which are related to the highest hierarchy level entity corresponding to the updated access rights of the highest hierarchy level entity.

8. The method of claim 6, wherein computing updated access rights for the higher hierarchy level entities comprises:

storing a second update event record for the highest hierarchy level entity in the first processing queue, the second update event record indicating the highest hierarchy level entity;

retrieving, by the scheduler, the second update event record from the first processing queue and identifying, based on the indication in the second update event record, the one or more corresponding higher hierarchy level entities which are related to the at least one highest hierarchy level entity;

storing a second entity event record per corresponding higher hierarchy level entity including the updated access rights of the highest hierarchy level entity and the access rights of the one or more higher hierarchy level entities in the second processing queue;

retrieving, by the scheduler, the second entity event record from the second processing queue and identifying the one or more corresponding lower hierarchy level entities which are related to the one or more higher hierarchy level entities;

storing a third entity event record per corresponding lower hierarchy level entity including the updated access rights of the highest hierarchy level entity, the updated access rights of the higher hierarchy level entity and the retrieved access rights of the one or more lower hierarchy level entities in the second processing queue; and retrieving, by the scheduler, the third entity event records from the second processing queue and mapping the updated access rights of the highest hierarchy level entity, the updated access rights of the higher hierarchy level entity and the access rights of the one or more lower hierarchy level entities to obtain updated access rights of the one or more corresponding lower hierarchy level entities.

9. The method of claim 8, wherein the first update event record and the further update event records comprise a time stamp indicating a point of time of the storage in the first processing queue and wherein the first update event record and any further update event records comprise a priority, wherein the first entity event records stored in the second processing queue inherit the priority and the time stamp of the first update event record, and wherein the priority of the first update event record is set higher than the priority of the second update event record, and wherein the scheduler prioritizes the retrieval of the first entity event record and the further entity event records from the second processing queue based on the priority.

10. The method of claim 9, wherein the second entity event records and the third entity event records inherit the priority and the time stamp of the second update event record.

11. The method of claim 10, wherein the first update request is received at a first point of time and the second update request is received at a second point of time which is before the first point of time, such that both, the first update event record and the second update event record are stored in the first processing queue and the time stamp of the first update event record indicates a later point of time than the time stamp of the second update event record, the method further comprising:

retrieving, by the scheduler, based on the priority of the first entity event records inherited from the first update event record and the priority of the third entity event records inherited from the second update event record, the first entity event records from the second processing queue;

discarding, based on the time stamp of the first entity event records inherited from the first update event record and the time stamp of the third entity event records inherited from the second update event record, the third entity event record from the second processing queue.

12. A system, comprising:

a normalized access control database storing access rights of a plurality of entities in an entity hierarchy with at least two hierarchy levels, a higher hierarchy level and a lower hierarchy level, wherein the plurality of entities comprise higher hierarchy level entities of the higher hierarchy level and lower hierarchy level entities at the lower hierarchy level; and a denormalized access control database, storing the access rights of the higher hierarchy level entities and the lower hierarchy level entities;

a computing device in communication with the normalized access control database and the denormalized access control database, the computing device configured to:

receive a first update request from a client to change the access rights of at least one higher hierarchy level entity;

update the access rights of the at least one higher hierarchy level entity in the normalized access control database;

compute updated access control rights for one or more corresponding lower hierarchy level entities which are related to the at least one higher hierarchy level entity corresponding to the updated access rights;

store the updated access rights of the one or more lower hierarchy level entities in the denormalized access control database;

store the updated access rights of the at least one higher hierarchy level entity in the denormalized access control database; and serve an access request from one of the one or more lower hierarchy level entities on the basis of the updated access rights at the lower hierarchy level stored in the denormalized access control database.

13. The system of claim 12, wherein the computing device comprises a scheduler, a first processing queue, and a second processing queue; and wherein the computing device is configured to compute the updated access rights by:

storing, in response to updating the access rights of the at least one higher hierarchy level entity in the normalized access control database, a first update event record indicating the higher hierarchy level entity in the first processing queue;

retrieving, by the scheduler, the first update event record from the first processing queue and identifying, based on the indication in the first update event record, the one or more corresponding lower hierarchy level entities which are related to the at least one higher hierarchy level entity;

retrieving, by the scheduler, the updated access rights of the higher hierarchy level entity and the access rights of the one or more corresponding lower hierarchy level entities from the normalized access control database;

storing a first entity event record per corresponding lower hierarchy level entity including the retrieved updated access rights of the higher hierarchy level entity and the retrieved access rights of the one or more lower hierarchy level entities in the second processing queue; and retrieving, by the scheduler, the first entity event records from the second processing queue and mapping the updated access rights of the higher hierarchy level entity and the access rights of the one or more lower hierarchy level entities to obtain updated access rights of the one of more corresponding lower hierarchy level entities.

14. The system of claim 13, wherein the first update event record and the further update event records comprise a time stamp indicating a point of time of the storage in the first processing queue.

15. The system of claim 14, wherein the first update event record and any further update event records comprise a priority, wherein the first entity event records stored in the second processing queue inherit the priority and the time stamp of the first update event record and wherein the scheduler prioritizes the retrieval of the first update event records an further update event records based on the priority and prioritizes the retrieval of the first entity event record and the further entity event records from the second processing queue based on the priority.

16. The system of claim 15, wherein the computing device is further configured to:

receive a second update request from the client to change the access rights of the lower hierarchy level entity, wherein the first update request is received at a first point of time and the second update request is received at a second point of time which is later than the first point of time, update the access rights of the at least one higher hierarchy level entity in the normalized access control database;

store a second update event record for the lower hierarchy level entity in the first processing queue, the second update event record indicating the lower hierarchy level entity and having set the priority higher than the priority of the first update event record such that both, the first update event record and the second update event record are stored in the first processing queue with the time stamp of the first update event record indicating an earlier point of time than the time stamp of the second update event record;

retrieve, by the scheduler, based on the priority of the first update event record and the priority of the second update event record, the second update event record from the first processing queue;

identify, based on the indication in the first update event record, the corresponding higher hierarchy level entity which is related to the lower hierarchy level entity;

retrieve, from the normalized access control database, the access rights of the identified higher hierarchy level entity;

map the retrieved access rights of the higher hierarchy entity to the updated access control rights of the lower hierarchy entity;

store the updated access rights of the one or more lower hierarchy level entities in the denormalized access control database;

in response to retrieving, by the scheduler, based on the priority of the first entity event records, the first entity event records from the second processing queue, discard, based on the time stamp of the first entity event records inherited from the first update event record, the first entity event record indicating the lower hierarchy level entity from the second processing queue.

17. A non-transitory computer-readable medium storing computer-readable instructions for execution by a processor of a computing device in communication with a normalized access control database storing access rights of a plurality of entities in an entity hierarchy with at least two hierarchy levels, a higher hierarchy level and a lower hierarchy level, wherein the plurality of entities comprise higher hierarchy level entities of the higher hierarchy level and lower hierarchy level entities at the lower hierarchy level, and a denormalized access control database storing the access rights of the higher hierarchy level entities and the lower hierarchy level entities, wherein execution of the instructions configures the processor to:
- receive a first update request from a client to change the access rights of at least one higher hierarchy level entity;
- update the access rights of the at least one higher hierarchy level entity in the normalized access control database;
- compute updated access control rights for one or more corresponding lower hierarchy level entities which are related to the at least one higher hierarchy level entity corresponding to the updated access rights;
- store the updated access rights of the one or more lower hierarchy level entities in the denormalized access control database;
- store the updated access rights of the at least one higher hierarchy level entity in the denormalized access control database; and
- serve an access request from one of the one or more lower hierarchy level entities on the basis of the updated access rights at the lower hierarchy level stored in the denormalized access control database.

18. The non-transitory computer-readable medium of claim 17, wherein the computing device comprises a scheduler, a first processing queue, and a second processing queue, and wherein execution of the instructions configures the processor to compute the updated access rights by:
- storing, in response to updating the access rights of the at least one higher hierarchy level entity in the normalized access control database, a first update event record indicating the higher hierarchy level entity in the first processing queue;
- retrieving, by the scheduler, the first update event record from the first processing queue and identifying, based on the indication in the first update event record, the one or more corresponding lower hierarchy level entities which are related to the at least one higher hierarchy level entity;
- retrieving, by the scheduler, the updated access rights of the higher hierarchy level entity and the access rights of the one or more corresponding lower hierarchy level entities from the normalized access control database;
- storing a first entity event record per corresponding lower hierarchy level entity including the retrieved updated access rights of the higher hierarchy level entity and the retrieved access rights of the one or more lower hierarchy level entities in the second processing queue; and
- retrieving, by the scheduler, the first entity event records from the second processing queue and mapping the updated access rights of the higher hierarchy level entity and the access rights of the one or more lower hierarchy level entities to obtain updated access rights of the one of more corresponding lower hierarchy level entities.

19. The non-transitory computer-readable medium of claim 18, wherein the first update event record and the further update event records comprise a time stamp indicating a point of time of the storage in the first processing queue.

* * * * *